Jan. 15, 1963  R. L. VALENTE  3,073,374
APPARATUS FOR POINTING WORKPIECES
Filed Feb. 3, 1960  2 Sheets-Sheet 1
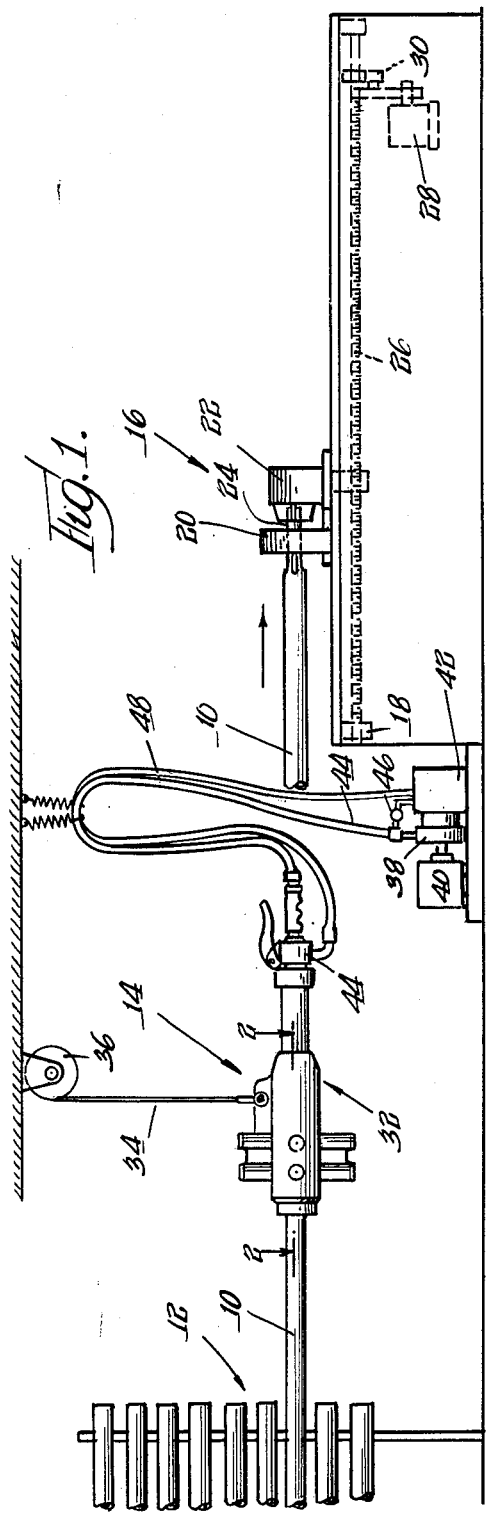
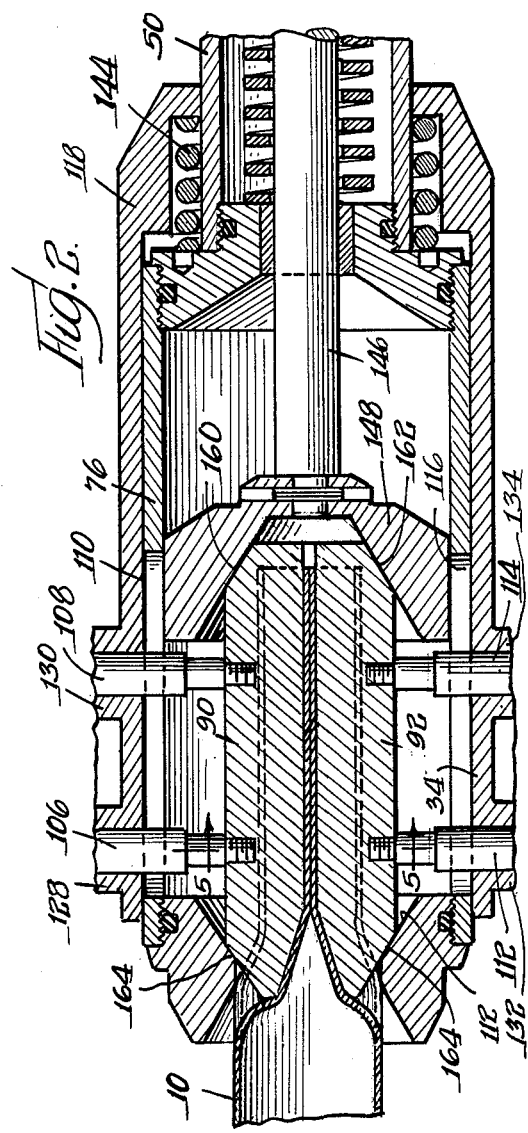
INVENTOR.
Raymond L. Valente
BY
Olson & Trexler
Attys

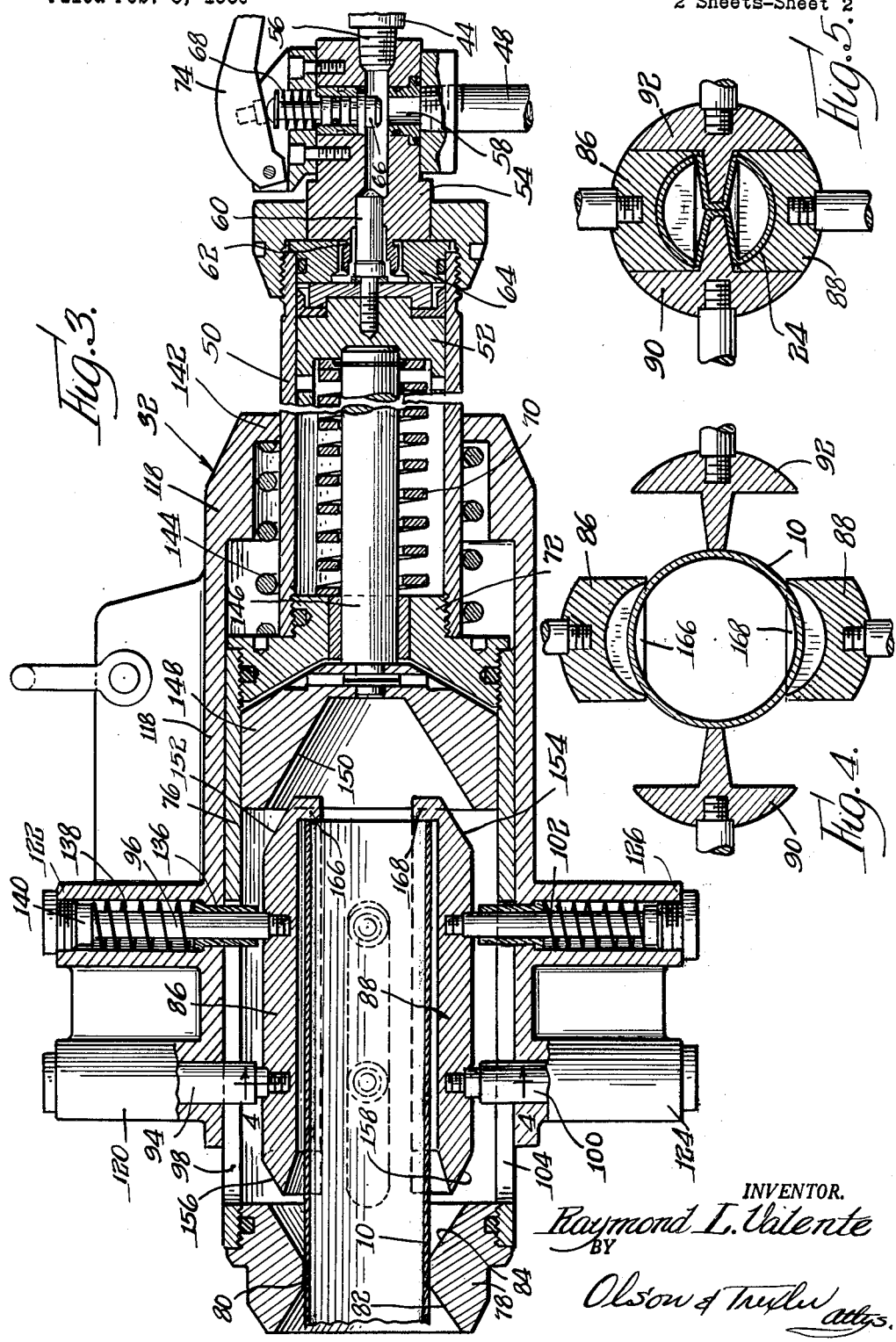

United States Patent Office 3,073,374
Patented Jan. 15, 1963

3,073,374
APPARATUS FOR POINTING WORKPIECES
Raymond L. Valente, Oak Lawn, Ill., assignor to Manco Manufacturing Company, Bradley, Ill., a corporation of Illinois
Filed Feb. 3, 1960, Ser. No. 6,553
4 Claims. (Cl. 153—48)

The present invention relates to a novel workpiece forming apparatus and more particularly, to a novel apparatus especially suitable for forming end portions of workpieces such as tubes, rods and the like.

In many instances it is necessary to draw a piece of tubing in order to reduce its size to a predetermined diameter. In general this procedure is accomplished by passing an extruded tubular billet through draw dies which progressively reduce the diameter of the tube until it reaches a desired size. Since the original tubing or billet is initially larger in diameter than the dies through which it must pass, an end portion of the tubing must be reduced or pointed in order to permit it to be inserted into the die opening. The pointed end portion is then engaged or clamped by suitable means which serves to pull the remainder of the tubing through the draw dies.

Heretofore, a generally common procedure for reducing or pointing an end portion of a workpiece was to utilize a stationary floor type swaging machine. The use of such machines is subject to several objections, including high machine and maintenance costs and a very high level of operating noise. Furthermore, the use of such floor type swaging machines usually creates material handling problems since the tubing must be transported to the swaging machine for pointing and then transported to the site of the drawing apparatus.

It is an important object of the present invention to provide a novel apparatus for reducing or pointing end portions of workpieces such as tubing and the like, which apparatus may be relatively economically installed, operated and maintained.

A further object of the present invention is to provide a novel apparatus capable of reducing or pointing the ends of workpieces, which apparatus requires little or no floor space and may be located immediately adjacent additional workpiece processing apparatus so as to minimize the material handling problems.

A more specific object of the present invention is to provide a novel apparatus of the above described type which is sufficiently portable so that it may be manually positioned for facilitating application of such apparatus to a workpiece.

Still another object of the present invention is to provide a novel apparatus capable of pointing a workpiece and being relatively quiet during a workpiece processing operation.

Other objects and advantages of the present invention will become apparent from the following description and the accompanying drawing wherein:

FIG. 1 is a simplified view showing an installation and including the apparatus constructed in accordance with the present invention and adapted to draw workpieces such as tubing and the like;

FIG. 2 is an enlarged fragmentary sectional view taken generally along line 2—2 in FIG. 1;

FIG. 3 is a partial sectional view similar to FIG. 2 but taken at right angles with respect to FIG. 2 and also showing die elements in an expanded condition;

FIG. 4 is an enlarged fragmentary sectional view taken along lines 4—4 in FIG. 3; and FIG. 5 is an enlarged fragmentary sectional view taken along line 5—5 in FIG. 2.

Referring now more specifically to the drawings wherein like parts are designated by the same numerals throughout the various figures, an installation is shown in FIG. 1 whereby workpieces such as length 10 of tubing may be drawn and reduced in diameter. The installation includes a rack 12 or any other suitable means for storing a supply of tubing 10, apparatus 14 for reducing or pointing end portions of each piece of tubing and a machine 16 for subsequently drawing the tubing.

The machine may be of various known constructions and, in general, includes a main frame 18 and draw die means 20 mounted above the main frame. A gripping head or bull block 22 adapted to grip a pointed end portion 24 of a length of tubing 10 inserted through the die is mounted for movement longitudinally of the frame structure 18. Any suitable means such as a feed screw 26 is provided for feeding the head 22 toward the right as viewed in FIG. 1 and thereby pulling or drawing the tubing through the die. The feed screw 26 may be driven by a suitable motor 28 through transmission means 30.

The apparatus 14 comprises a hydraulically actuated tool 32 which is adapted to be suspended by a cord 34 at any desired location so that it may be readily manually manipulated or positioned for engagement with a workpiece. The cord 34 is wound on a suitably resiliently or spring biased reel mechanism 36. The reel mechanism may be constructed in a known manner so that the resilient or spring force applied thereby to the cord or cable 34 substantially counterbalances the weight of the tool 32, so that the tool will tend to remain at any elevation to which it is manually adjusted.

The tool 32 is connected with any suitable means for continuously supplying an hydraulic fluid under pressure. As shown in simplified form in FIG. 1, such means may include a pump 38 driven by an electric motor 40 and having an inlet connected with a fluid reservoir 42. The outlet of the pump is connected with a flexible conduit or hose 44 which extends to the tool 32. In addition, the pump outlet is connected with a pressure relief valve 46. Another flexible hose or conduit 48 serves to return hydraulic fluid from the tool 32 to the reservoir.

As shown best in FIG. 3, the tool 32 comprises a cylinder 50 having a piston 52 operable therein. A valve body 54 is suitably secured to one end of the cylinder and is provided with an inlet port 56 connected with the hose 44 and an outlet port 58 connected with the hose 48. The valve body also is provided with a central passageway 60 communicating with the inlet and outlet ports and also with a port 62 through an end member 64 of the hydraulic cylinder.

In order to control the flow of hydraulic fluid through the valve body 54 and thus the operation of the piston 52, a valve element 66 is disposed for closing the port 58. A spring 68 is associated with the stem of the valve element 66 for normally maintaining the valve element in the open position shown in FIG. 3. With the valve element in the open position, hydraulic fluid normally flows freely directly from the inlet port 56 and out through the outlet port 58 so that the piston 52 remains in the fully retracted position shown in FIG. 3 as a result of the pressure applied to the piston by a compression spring 70 disposed between the piston and an end member 72 of the hydraulic cylinder. A manually operable lever 74 is provided for enabling an operator to depress the valve element 66 for closing the outlet port 58 and thereby directing the hydraulic fluid through the passageway 60 to the cylinder for actuating the piston toward the left, as viewed in FIG. 3. As will be understood, when the lever is subsequently released to permit the valve element 66 to open, the hydraulic pressure within the cylinder will be relieved and the spring 70 will cause the piston to return to its retracted position.

In accordance with an important feature of the present invention, the tool 32 is provided with means for receiving and pinching an end portion of a workpiece or tube 10. This means comprises a cylindrical housing member 76 which is fixed to a radially outwardly extending flange portion of the hydraulic cylinder end member 72. An annular member 78 is threadedly or otherwise fixed to the outer end of the cylindrical housing 76.

The annular member 78 is formed with an inner cylindrical surface 80 defining a portion of the aperture therethrough and having a diameter similar to the external diameter of the tubing 10 so that it is adapted to guide and support the tubing substantially centrally within the cylinder 76. The annular member 78 is provided with a flaring mouth 82 for facilitating initial insertion of the tubing through the opening. In addition, a flaring cam surface 84 extends inwardly from the guide surface 80 for the purpose described fully herein below. In order to pinch or form an end portion of the tubing, pairs of dies 86—88 and 90—92 are disposed within the cylindrical housing member 76. These dies are supported so that they are adapted to move between the open or extended positions shown in FIGS. 3 and 4 and the closed workpiece pinching positions shown in FIGS. 2 and 5. More specifically, the die 86 is fixed to radially inner ends of a pair of guide rods 94 and 96 which extend radially outwardly from the housing 76 through a longitudinally extending slot 98 in the housing wall. The die 88 is similarly connected with inner ends of guide rods 100 and 102 extending through an elongated slot 104 in the wall of the cylindrical housing 76 oppositely disposed from the slot 98. In addition, die elements 90 and 92 are respectively fixed to inner ends of guide rods 106—108 extending outwardly through slot 110 in the cylinder 76 and guide rods 112 and 114 extending outwardly through a slot 116 in the cylinder.

A cylindrical slide member 118 extends around the cylindrical housing member 76 and is axially slidable relative thereto. As shown best in FIGS. 2 and 3, the cylindrical slide member 118 includes pairs of radially disposed hollow socket portions 120—122, 124—126, 128—130 and 132—134 for slidably receiving the die supporting and guiding rods. As shown in FIG. 3, a bushing 136 is mounted in the cylindrical slide member for slidably guiding the rod 96, and a spring 138 is compressed between the bushing and an enlarged outer end or head portion 140 of the rod 96 so that the rod and die element carried thereby are resiliently biased to the position shown in FIG. 3. Additional bushings are provided for receiving the remaining die supporting rods and additional springs are provided between such bushings and enlarged head portions of the remaining rods so that all the rods are normally resiliently biased outwardly. Since such additional bushings and springs are identical to the elements 136 and 138, they need not be described in detail.

The cylindrical slide member 118 has an end portion which telescopes over the hydraulic cylinder 50. This end portion is provided with an internal flange or shoulder 142 closely but slidably surrounding the hydraulic cylinder 50. A compression spring 144 is arranged around the cylinder 50 and between the shoulder 142 and a radially outwardly projecting portion of the cylinder end member 72. The spring 144 thus serves to bias the slide member 118 to the retracted position shown in FIG. 3.

In order to actuate the die elements for engaging and forming or pinching an end portion of a workpiece, a rod 146 is connected with the piston 52 and extends through a central aperture in the end member 72. A cam block 148 is fixed on the outer end of the piston rod 146 and is formed with an internal conical cam surface 150. As shown in FIGS. 2 and 3 the die elements 86 and 88 are formed with bevelled ends or cam surfaces 152 and 154 engageable with the cam surface 150. These die elements are also formed with bevelled cam surfaces 156 and 158 at their opposite ends which are complementary to and engageable with the conical cam surface 84 on the end member 78. The die elements 90 and 92 are formed with similar bevelled cam surfaces 160 and 162 engageable with the conical cam surface 150 and cam surfaces 164 and 166 engageable with the conical cam surface 84.

With the structure described above, a piece of tubing 10 may be processed in the following manner. An end portion of the tubing is axially inserted into the tool through the end member 78 and between the die elements until it is arrested by inwardly projecting abutments 166 and 168 provided at the inner ends of the die elements 86 and 88, as shown in FIG. 3. Then the operator presses the handle 74 so as to close the outlet port 58 and direct the hydraulic fluid under pressure to the cylinder 50. The hydraulic fluid advances the piston against the action of the spring 70 so that the cam block 148 is advanced into engagement with the complementary cam surfaces at the adjacent ends of the die elements. Further advancement of the piston causes the die elements to move axially with the cam block 148 so that they are forced into engagement with the cam surface 84 of the end member 78. Of course, this action causes the slide member 118 to move axially outwardly along the cylindrical housing member 76. Upon still further advancement of the piston, the die elements are clamped with considerable pressure between the conical cam surfaces 84 and 150 so that the die elements are forced radially inwardly, as shown in FIG. 2 for forming or pinching the end portion of the tubing.

When the pinching operation has been completed, the operator releases the lever 74 so that the piston, the cylindrical slide member and the die elements are returned to their normal positions by their associated springs. Then the tubing is removed from the tool 32 and the pointed end portion 24 is inserted through the die means 20 and is engaged by the jaws of the bull block 22. Then the operator actuates the machine 16 so that the tubing is drawn completely through the die means 20 for reducing its diameter throughout its entire length.

While the preferred embodiment of the present invention has been shown and described herein, it is obvious that many structural details may be changed without departing from the spirit and scope of the appended claims.

The invention is claimed as follows:

1. A tool of the type described for forming and reducing an end portion of a workpiece such as a tube and the like, comprising a fluid cylinder connectable with a source of fluid under pressure, a piston reciprocally disposed within said cylinder and operable in one direction by fluid under pressure, housing means fixed with respect to said cylinder and extending axially from said cylinder in one direction, said housing means having an opening through an outer end thereof for enabling an end portion of a workpiece to be axially inserted into the housing means, a plurality of annularly spaced die members mounted within said housing means for bodily and substantially parallel movement radially and also axially of said housing means between a radially collapsed workpiece engaging and forming condition and a radially expanded condition, and means connected with said piston and engaged with said die members for bodily moving said die members in substantially parallel relationship toward said radially collapsed condition during axial outward movement of the piston relative to said housing means.

2. A tool, of the type described for forming and reducing an end portion of a workpiece such as a tube and the like, comprising a fluid cylinder connectable with a source of fluid under pressure, a piston reciprocally disposed within said cylinder and operable in one direction by fluid under pressure, housing means fixed with respect to said cylinder and extending axially from said cylinder in one direction, said housing means having an opening through an outer end thereof for enabling an end portion of a workpiece to be axially inserted into the housing means, die means mounted within said housing means for movement radially and also axially of said housing means between a radially collapsed workpiece engaging and forming condition and a radially expanded condition, means connected with said piston and engaged with said die means for forcing said die means toward said radially collapsed condition during axial outward movement of the piston relative to the housing means, first cam means disposed adjacent and fixed with respect to an outer end of said housing means for engaging said die means upon movement of the die means axially toward the outer end of said housing means, and said means connected with said piston for actuating said die means comprising second cam means engageable with said die means when said piston is actuated toward the outer end of said housing means for forcing said die means axially against said first mentioned cam means, said first and second cam means serving to cam said die means radially inwardly.

3. A tool of the type described for forming and reducing an end portion of a workpiece such as a tube and the like, comprising a fluid cylinder connectable with a source of fluid under pressure, a piston reciprocally disposed within said cylinder and operable in one direction by fluid under pressure, housing means fixed with respect to said cylinder and extending axially from said cylinder in one direction, said housing means having an opening through an outer end thereof for enabling an end portion of a workpiece to be axially inserted into the housing means, slide means around said housing means and slidable axially of said housing means and cylinder, said housing means having axially extending slot means in a side wall thereof, and support rod means extending generally radially of said housing means and through said slot means and being carried by and radially slidable relative to said slide means, die means fixed on said support rod means within said housing means for movement radially and also axially of the housing means between a radially collapsed workpiece engaging in forming condition and a radially expanded condition, and means connected with said piston and engaged with said die means for forcing said die means toward said radially collapsed condition during axial outward movement of the piston relative to the housing means.

4. A tool, as defined in claim 3, which includes spring means carried by said slide means and engageable with said support rod means for yieldably biasing the support rod means and the die means carried thereby, toward radially expanded positions, and additional spring means acting between said slide means and said housing means for resiliently biasing said slide means axially away from the outer end of said housing means and toward a retracted position.

References Cited in the file of this patent

UNITED STATES PATENTS

| | | |
|---|---|---|
| 1,011,193 | Hackney | Dec. 12, 1911 |
| 1,782,219 | Wallace | Nov. 18, 1930 |
| 1,818,435 | Smith et al. | Aug. 11, 1931 |
| 1,890,016 | Smith et al. | Dec. 6, 1932 |
| 2,568,054 | Clapp | Sept. 18, 1951 |

FOREIGN PATENTS

| | | |
|---|---|---|
| 577,590 | Great Britain | May 23, 1946 |